Figure 1:
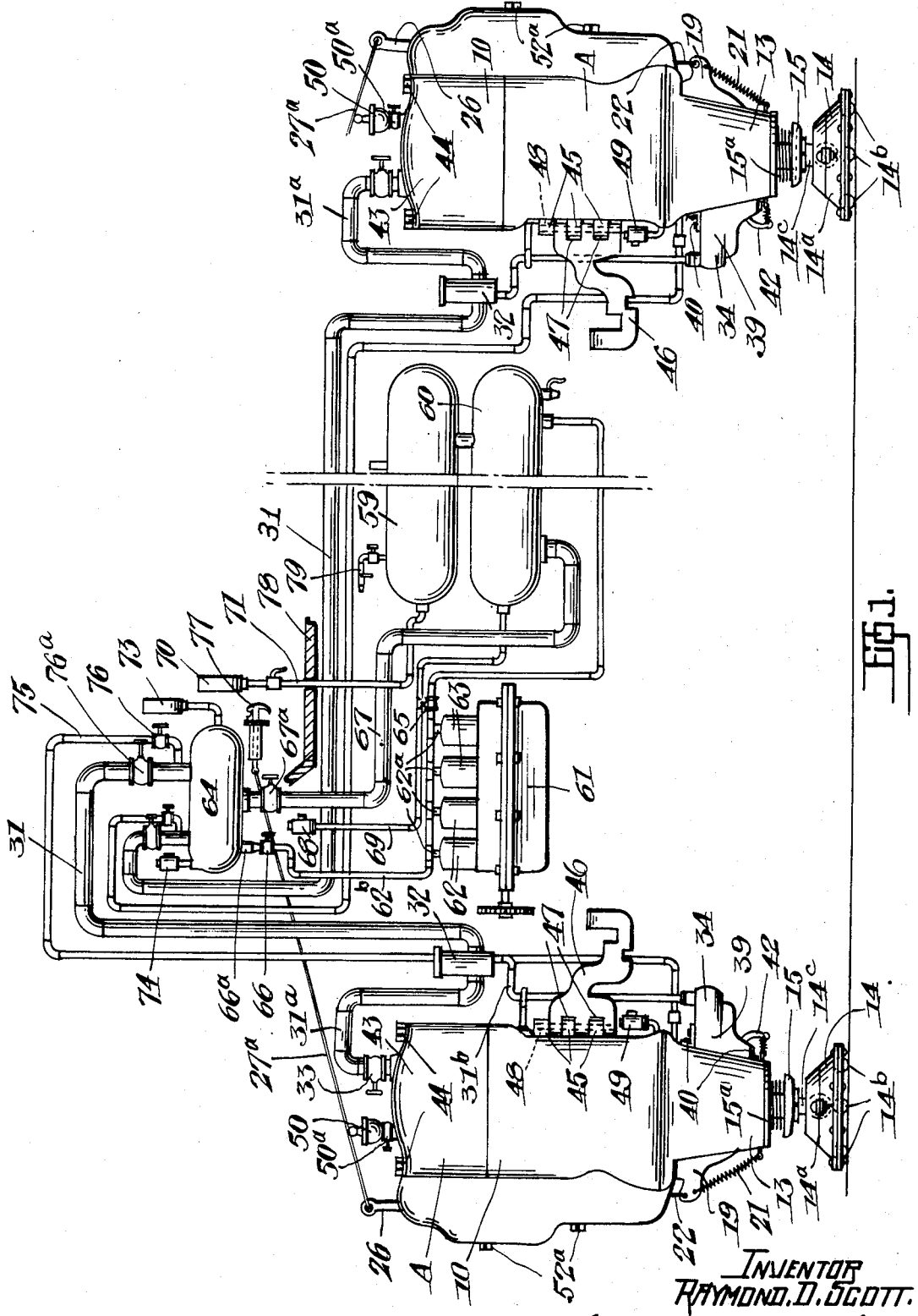

May 4, 1926.

R. D. SCOTT

JACK

Filed May 2, 1923      3 Sheets-Sheet 1

1,583,189

INVENTOR
RAYMOND. D. SCOTT.
BY Fetherstonhaugh & Coy.
ATTYS.

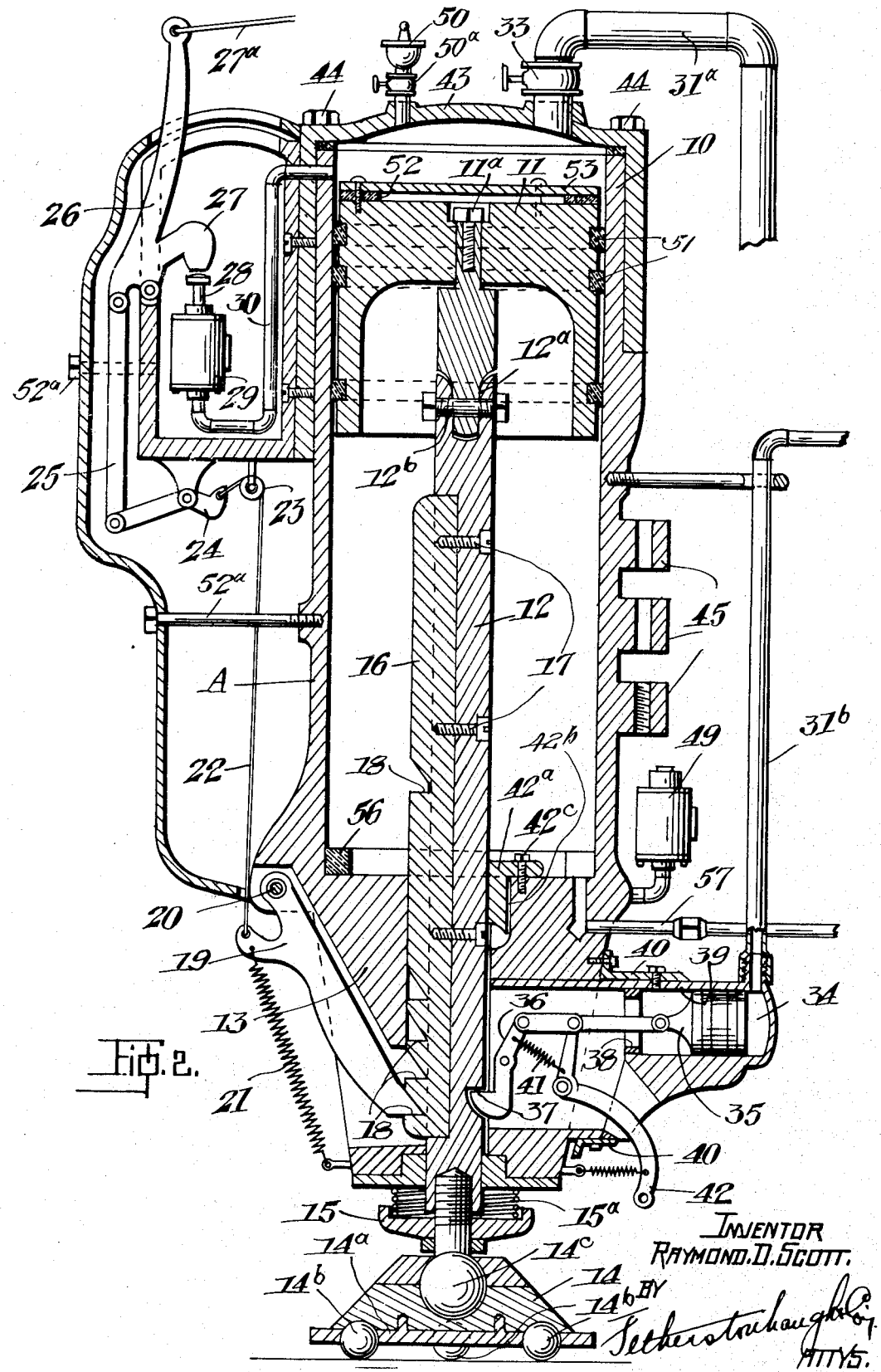

May 4, 1926.
R. D. SCOTT
JACK
Filed May 2, 1923      3 Sheets-Sheet 3
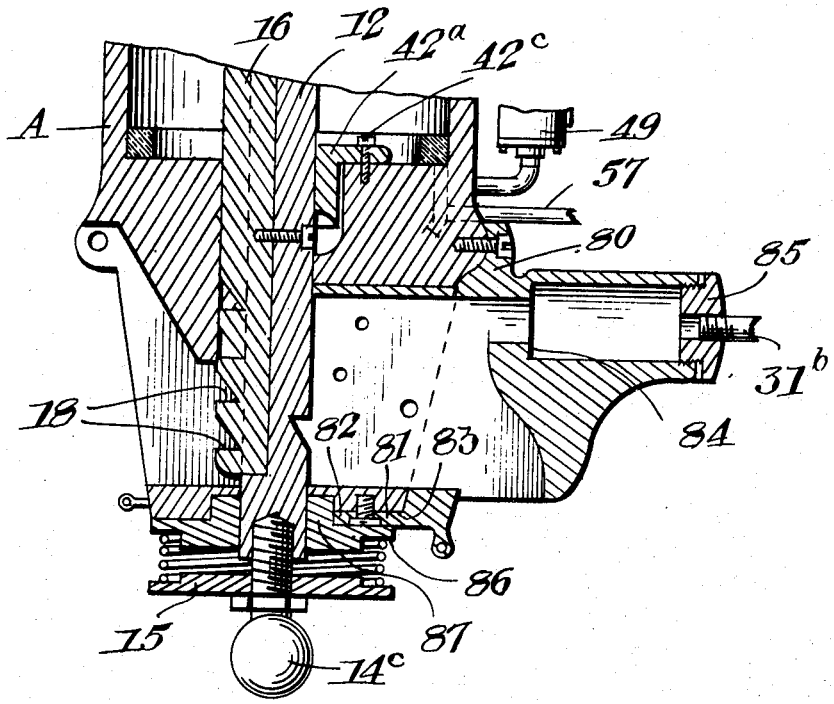
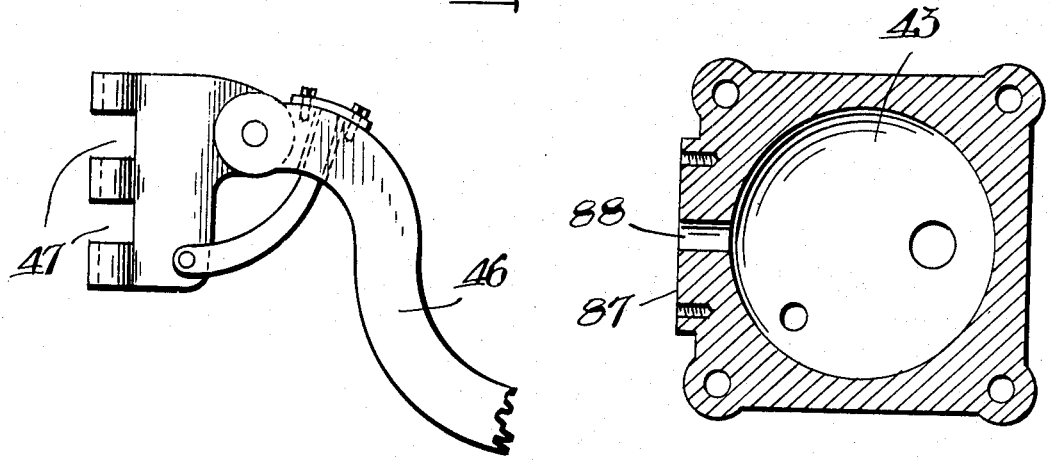
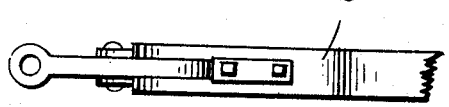

Patented May 4, 1926.

1,583,189

UNITED STATES PATENT OFFICE.

RAYMOND DORSEY SCOTT, OF CHICAGO, ILLINOIS.

JACK.

Application filed May 2, 1923. Serial No. 636,201.

*To all whom it may concern:*

Be it known that I, RAYMOND DORSEY SCOTT, a citizen of the United States of America, and resident of the city of Chicago, in the State of Illinois, and United States of America, have invented certain new and useful Improvements in Jacks, of which the following is a specification.

This invention relates to improvements in jacks and particularly to the construction, attachment and operation of a lifting jack or lifting jacks for automobiles, auto trucks, street cars, and the like.

The objects of the invention are to provide instant means for raising or lowering either of the four wheels of such vehicles separately or collectively at will and from the operator's seat of the vehicles.

Further objects are to afford proper means for attaching the lifting jack to the axle and axle housing, so that it will be perfectly substantial and safe and not obstruct the car in any way under varying speeds or over rough roads, sudden jarring or jerking.

Still other objects are to provide regulating and emergency means for the jacks, so that in operation to raise the wheels and on the operation being interrupted, it will be safe for anyone to move around or underneath the car as may be necessary.

Other objects are to provide means whereby the jacks can be operated to lower the wheels without sudden jar, either through the controls from the operator's seat at the dash board or the jacks, and furthermore, the construction and arrangement of a system for lifting vehicles in which the several parts will efficiently and economically perform the various functions required of them.

The foregoing objects are attained by the mechanism described in the present specification and illustrated by the accompanying drawings that form part of the same.

Referring now to the drawings, in which like characters of reference indicate corresponding parts in each figure, Figure 1 is a side elevation of the device, with operating mechanism installed, Figure 2 is a vertical section through one of the jacks, and Figure 3 is an enlarged vertical section through the lower portion of the jack, in modified form.

In the drawings, A designates a lifting jack as a whole, of which one, two or more may be used and here illustrated, in Figure 1, as being employed one for the front axle and another for the rear axle. Two for the front axle and two for the rear axle, however, may be used with most satisfactory result and, as will be understood, the individual construction and operation of all the jacks is similar. It is, therefore, proposed to describe in detail in the present specification the construction and operation of one of the jacks.

This jack, as above mentioned, is designated A and comprises a cylinder 10 in which in a plunger head 11 having a plunger rod 12 of the two-section type with the lower end connected to the upper or plunger end through a swivel joint $12^a$ connected by suitable wrist pin $12^b$. The plunger rod 12 is connected to the head 11 by a bolt $11^a$. The lower end of the plunger 12 is provided with a ball and socket foot 14 adapted to contact with the ground. This ball and socket foot member comprises a foot $14^a$ with rollers $14^b$ and is formed with a socket designed to receive therein a ball stud $14^c$ screw connected at its upper end to the plunger rod 12. 15 is a wing check nut adapted to hold the ball stud securely and also to secure and hold in position a plunger kick spring $15^a$ set between said nut and the lower end of the cylinder base 13.

16 is a ratchet bar secured at 17 to the plunger rod and provided with slots 18 on the outside and at spaced intervals therein. 19 is a ratchet dog pivotally mounted at the outer end of the cylinder, at 20, by a suitable pin and bushing. This dog is spring held against the ratchet bar 16 and designed to engage with the slots 18 therein on the ratchet bar being operated, as hereinafter more fully referred to. 21 is a tension spring actuating the member 19.

From the foregoing, it will be noted that the spring acuated ratchet member 19 in combination with the slotted ratchet bar 16 operates as a latch and for this purpose is connected to the source of power supply by means of a cable 22 travelling on a pulley 23. This cable is connected at its other end to a lever member 24 to be in turn connected to a rod 25 and thence to a valve plunger lever 26.

27 is a valve plunger connected through lever 26 and suitable rods $27^a$ to the power supply operating means. This valve plunger is designed to contact with the valve stem 28 of an exhaust valve 29, connected through an exhaust pipe 30 with the top of the cylinder 10, whereby the air is exhausted therefrom when necessary.

The dog latch 19 and the exhaust valve plunger 27 are so adjusted that when operated by the opening of the air releasing means, the latch first disengages with the ratchet bar 16 and then the plunger 27 strikes the valve stem 28 exhausting the air out of the cylinder 10 through the exhaust pipe 30.

Compressed air is supplied to operate the jack through an air pipe 31 connecting with an automatic air release valve 32, see Figure 1, and communicating with the top of the cylinder 10 through the pipe 31$^a$ provided with a controlling valve 33, the said air pipe 31 also communicating through the automatic air release valve 32 and through a pipe 31$^b$ with the lower end of the cylinder into a compression chamber 34 formed in the jack.

This chamber is provided with a trigger latch plunger 35 connected to a trigger dog or latch 36 designed to engage with the slot 37 in the plunger rod. When this latch plunger 35 is moved inwardly, the latch 36 is released, while the plunger 35 is checked at the end of its stroke by an adjustable check ring 38 screwed into the cylinder or chamber 34.

39 is a housing fitted into a suitable slot or bed in the cylinder base 13 adjacent the plunger rod 12 and is held in place by an angle iron and suitable bolts 40 and attached at one end to the cylinder base and at the other end to the latch housing in such manner that the latch 36 is retained firmly in contact with the plunger rod 12 by spring 41. 42 is the latch lever or trigger extending out through a slot in the latch housing and is designed to release the plunger rod 12 by hand operation by drawing the trigger outwardly.

To prevent the air from escaping through the plunger rod guide of the cylinder base 13, a bushing 42$^a$, is provided to fit into the cylinder base at 42$^b$ forming a tight joint between the plunger rod and the plunger rod guide when the bushing is screwed down by the screws 42$^c$.

43 is the cylinder cap or cover designed to be secured on the cylinder by suitable bolts 44. 45 are a plurality of projections on the side of the cylinder adapted to engage with an attachment bracket 46, Figure 1, formed with slots or recesses 47 therein and into which the projections 45 fit and are designed to be fixedly secured by means of a king bolt 48, (not shown in the drawings).

49 is a release valve through which the resisting back pressure formed in the cylinder between the lower end of the plunger head and the cylinder base is allowed to escape. 50 is an oil cup with valve 50$^a$, while 51 are snap rings for the plunger.

The inside walls of the cylinders are kept lubricated by a felt oil ring 52 which sets around the edge of the plunger head in the space 52$^a$. The felt ring 52 is then held in place by the retainer ring 53 on the plunger 11 as illustrated in Figure 2. When the felt ring and retainer are attached to the plunger head, several small holes in the retainer ring are set practically beneath the oil cup 50 which screws into the cylinder cover, so that when oil is allowed to run out of the cup 50 into the cylinder by operating the valve 50$^a$, it will drop on the felt ring 52 underneath the retainer through the small holes therein, keeping the felt ring oil soaked.

56 is a gasket member designed in combination with the cylinder base 13 to contact with the bottom end of the plunger 11 when the latter moves downwardly.

The foregoing description, it will be noted, is particularly applicable, as previously mentioned, to my improved jack as shown in Figure 2 and reference is now had to the means for operating the jack consisting of air pressure mechanism carried by the motor vehicle and operated and controlled from the dash board of same. This mechanism comprises, as here shown, two compressed air tanks 59 and 60, which, when installed, will be suspended from the body of a car, preferably at the rear, and will be used only in cases where space will not permit one tank of sufficient size. Practically all trucks and most pleasure cars will accommodate a suitable size single tank.

The compressed air in reserve in the tanks 59 and 60 is supplied by an air pump 61 of the ordinary motor driven type as fitted to automobiles and especially arranged for the present system with cylinders 62 and 63 designed to supply the reserve tanks, as above mentioned, and also to operate the jacks direct through a feed tank 64.

This is accomplished by means of an outlet pipe 62$^a$ from the pump through valve 65 into the main air reserve tank 60 and another outlet pipe 62$^b$ with valve 66 and a check valve 66$^a$ into the small feed tank 64, whereby the jack is operated to raise or lower, through the attachment lifting bracket, the wheels of a car either by reserve pressure from the main tank 60 or pressure direct from the pump 61. 67 is the pressure feed line from the main tank 60 to the feed tank 64 and provided with a feed control valve 67$^a$, while over-limited pressure in the tank 60 is released by the safety or pop valve 68 connected to the safety valve air line 69. 70 is a pressure gauge for the reserve tank at the end of the pressure gauge line 71.

31 is the air pipe communicating with the feed tank 64 and through the automatic release valve 32 with the pipe 31ª leading into the top of the jack cylinder 10 and through the pipe 31ᵇ and the pressure chamber 34 adjacent the bottom of the cylinder 10. 73 is a suitable pressure gauge for the feed tank 64. 74 is a release valve attached to the feed tank 64 and is necessary in cases when the jacks are operated from the pump direct.

To replace the plunger automatically from the operator's seat when the jack controlling valves 76ª are closed to prevent air escaping through the air lines 31 into the jack cylinder, the air line 75 is provided. When the plunger control valve 76 in the air line 75 communicating with the base of the cylinder is operated it releases the pressure therethrough into the cylinder beneath the plunger 11. The pressure gradually forces the plunger upwardly in the cylinder until the trigger dog 36 engages the slot 37, the spring 15ª absorbing the shock of the upward movement. The plunger having completed its upward stroke is locked in position, the latch 19 preventing any upward movement and the dog 36 preventing any downward movement. Therefore over pressure in the cylinder will automatically exhaust through the release valve 49. 77 is a spring trigger air release on the dash board suitably connected through rods 27ª with the valve plunger lever 26 and through which with the dog latch member 19, the jack cylinder is exhausted mechanically.

If desired, the jacks may be released by hand, as already described, by means of the trigger latch 42. 78 is a section of the front floor of the automobile. 79 is an air release valve for the pressure reserve tanks to inflate the vehicle tires.

The jacks are so easily controlled that, if so desired, they may also be used as a safety locking device. This may be accomplished by operating one of the jacks in the ordinary manner.

To operate the jacks, the feed valve 67ª is opened releasing the pressure from the compressed air tank into the small feed tank 64 and up to the control valves 76 and 76ª. Then to raise the wheels, valve 76ª is opened releasing the pressure through the air pipe 31 and through the automatic release valve 32, which allows the pressure to first enter into the compression chamber 34 of the trigger latch plunger 35 forcing the plunger inwardly and the trigger latch 36 outwardly thereby disengaging the latch from the jack plunger rod 12. After the plunger stroke of the latch plunger 35 is complete and the jack plunger rod 12 is released, the valve 32 then opens releasing the pressure into the top of the cylinder 10 onto the plunger 11 causing it to descend gradually until the ball socket foot 14 comes in contact with the ground and as the pressure continues downwardly causes the jack cylinder to move upwardly bringing with it the attachment bracket 46 connected to the vehicle axle.

When the jack plunger 11 moves downwardly the resisting back pressure formed in the cylinder between the lower end of the plunger head 11 and the cylinder base 13 escapes through the release valve 49 which releases only under certain pressure, therefore, as the plunger moves downwardly until the foot 14 contacts with the ground, the plunger head 11 stops a few inches from the end of the stroke just above the cylinder base and remains still, while under increasing pressure the cylinder then completes the stroke raising the wheel by moving it upward until the base 13 and gasket member 56 come firmly in contact with the bottom end of the plunger.

It should also be noted that as the plunger moves downwardly, the latch dog 19 slides along the face of the ratchet bar 16 and as the stroke downward is completed and the wheels raised, the dog 19 will have passed the last of the slots 18 in the ratchet bar and will hold a position a little above it as long as the pressure in the cylinder is sufficient to hold the load. If for any cause, the pressure in cylinder should weaken, the latter will steal upwardly until the latch member 19 engages with the first slot 18 of the bar 16 retaining the cylinder until the member 19 is released to lower the wheels.

From the foregoing it will be observed that when the plunger 11 moves downwardly under pressure to raise the jack, the air underneath it escapes by force through the valve 49. In order to replace the plunger, after the cylinder is exhausted, the valve 49 is so constructed and regulated as only to release air under a certain pressure and therefore it retains the air administered through the valve 76 into the cylinder up to a point sufficient to allow the plunger to be properly replaced. On the replacement of the plunger the valve 49 automatically begins to release or blow off as a signal indicating that the valve 76 should be closed.

In operating the jacks to lower the wheels, the spring trigger air release 77 attached to the dash board of the car is pulled completely back operating the exhaust valve plunger lever 26, which, through the rod 25 and connecting lever 24 and cable 23, will clear the latch member 19 from the plunger rod ratchet bar 16 and then will operate the plunger 27 to operate the exhaust valve 28 to exhaust the air out of the top of the cylinder 10 through the exhaust pipe 30 and as the air is exhausted the jack plunger 12 slides partly back up into the cylinder and the attachment bracket supporting wheel will with the cylinder slowly descend until the cylinder and wheel assume their normal position.

From the foregoing, it will be seen that I have invented a simple and effective means readily adapted to and carried on motor vehicles for not only raising and lowering the wheels but for locking the car and with the expenditure of a minimum of energy.

In Figure 3 I have shown a modified form of portions of my invention.

Referring to them more particularly, Figure 3 is a sectional detail of the cylinder base showing the housing for the release latch 36 with operating links discarded for clarity, also showing in modified construction comprising projections 80 and 81 instead of the angle elements 40. The projections permit the housing to be supported in relation to the cylinder base. When the housing is mounted into the cylinder base, the top projection 80 is attached at the upper end of the cylinder base by a suitable screw while the lower projection 81 is formed with an end 82 which slides into a slot 83 at the bottom of the cylinder base and flush with it and is attached by a short counter-sunk screw between the upper side of the bottom bushing shoulder and the lower surface of the cylinder base. The extreme end of the projection 81 is provided with a central aperture to attach the lower spring which connects to the trigger lever.

Another modification of the release latch housing is that the cylinder or chamber formed therein has a shoulder base at the inner end of the cylinder at 84 to check the release latch plunger stroke, thereby eliminating the use of a check ring.

The chamber or cylinder of the release latch housing is also provided in the modified form here shown with a cap or cover 85 with gasket member and which is adapted to screw into the mouth of said chamber. This cover also has a central opening to receive the inlet pipe from the automatic release valve.

In Figure 3 the base bushing is shown removed for clarity, the numeral 86 indicating the shoulder at the bottom thereof adapted to engage with the upper end of the kick spring while 87 indicates the sliding guide washer underneath the bushing thus keeping the kick spring in vertical position around the plunger rod.

As many changes could be made in the above construction and many apparently widely different embodiments of my invention, within the scope of the claims, constructed without departing from the spirit or scope thereof, it is intended that all matter contained in the accompanying specification and drawings shall be interpreted in an illustrative and not in a limiting sense.

What I claim as my invention is:

1. In a lifting jack of the character described comprising a casing and a jack foot, a plunger provided with a two section plunger rod, wrist pin and swivel joint connecting means for said sections, a recess in the lowermost of said sections, a ratchet bar adapted to engage said recess, a slot on said section, a release latch, and a dog carried by the release latch adapted to engage with the slot, adjustment means for said lower plunger rod section, comprising a wing check nut, and a ball stud pin, lock nut for said pin and ball socket, and screw attaching means adapted to connect with the jack foot.

2. In a lifting jack of the character described, the combination with the plunger rod having a slot therein, of a compression chamber, a latch plunger in the compression chamber and a trigger dog connected to the plunger and designed to engage with said slot whereby on said latch plunger being moved inwardly, the trigger dog is released to alow the lifting plunger to move downward on the power stroke, and a tensioning spring for the dog.

3. A lifting jack of the character described comprising, in combination with the power supply means and the jack cylinder, a plunger-rod, an exhaust valve, a release hammer designed to contact with the exhaust valve, an exhaust pipe connecting the exhaust valve with said cylinder, a dog pivotally mounted on the cylinder and adapted to engage with a ratchet on the plunger-rod, and cable and link means connecting the ratchet dog with the release hammer whereby on the opening of the air release the dog latch disengages with the plunger to permit the release hammer to operate the exhaust valve.

In witness whereof I have hereunto set my hand.

RAYMOND DORSEY SCOTT.